United States Patent

[11] 3,568,957

| [72] | Inventor | Lorin A. Wood |
| | | Lakewood, Calif. |
| [21] | Appl. No. | 775,273 |
| [22] | Filed | Nov. 13, 1968 |
| [45] | Patented | Mar. 9, 1971 |
| [73] | Assignee | McDonnell Douglas Corporation |

[54] LONG STRUCTURAL COLUMN SUPPORT
3 Claims, 7 Drawing Figs.

[52] U.S. Cl.................................................... 244/42,
74/89.15, 74/424.8
[51] Int. Cl..................................................... B64c 3/38,
B64c 9/02
[50] Field of Search........................................ 74/424.8,
424.8(A), 424.8(B); 244/42, 42.3, 42.6, 42.61,
42.62, 43.44; 74/89.15

[56] References Cited
UNITED STATES PATENTS

| 2,226,811 | 12/1940 | Evans............................ | 244/42(.62) |
| 2,404,956 | 7/1946 | Gouge........................... | 244/42(.62) |
| 2,776,577 | 1/1957 | Olchawa........................ | 244/42(.6)X |

*Primary Examiner*—George E. A. Halvosa
*Assistant Examiner*—Jeffrey L. Forman
*Attorneys*—Walter J. Jason, Donald L. Royer and Robert O. Richardson ABSTRACT: A structural column support having two external superimposed threads of different lead whereby a load carrying nut moves along the column at a higher rate than the screw support sleeve which follows the threads of lesser lead. The sleeve thus divides a single long column into two shorter columns which may be of a smaller diameter and lesser weight than the longer unsupported column, while resisting the same bending and buckling compressive forces.

PATENTED MAR 9 1971
3,568,957
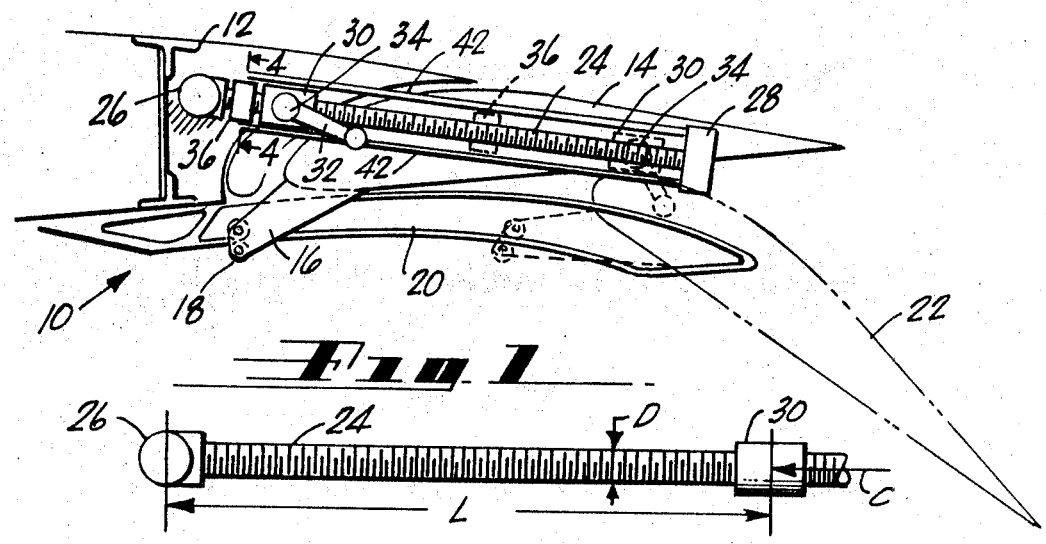
Fig. 1
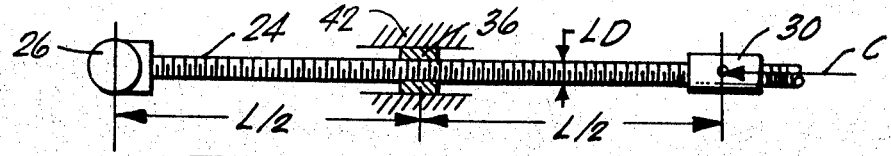
Fig. 2A
Fig. 2B
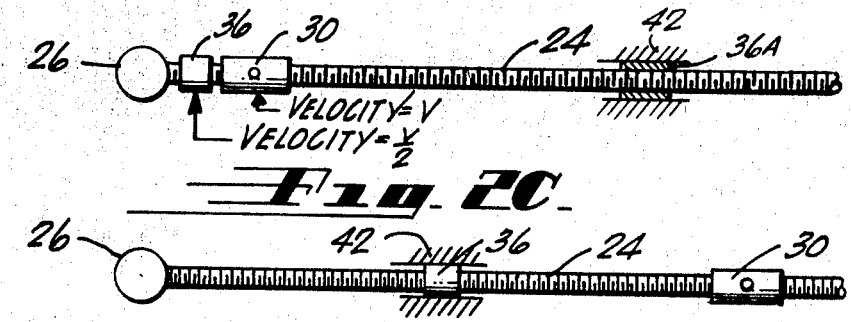
VELOCITY=V
VELOCITY=V/2
Fig. 2C
Fig. 2D
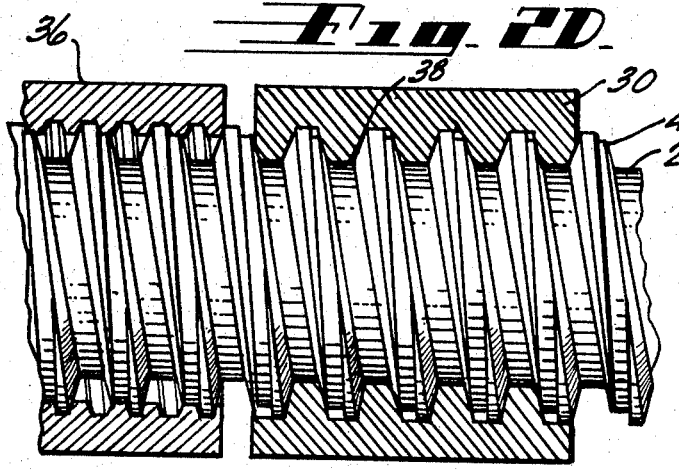
Fig. 3
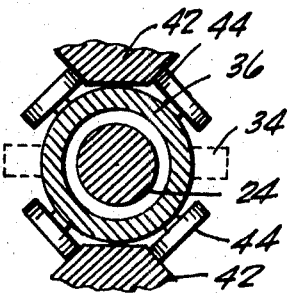
Fig. 4
INVENTOR.
LORIN A. WOOD
BY Robert O.
Richardson
ATTORNEY

LONG STRUCTURAL COLUMN SUPPORT

BACKGROUND OF THE PRESENT INVENTION

Structural members, which are subject to compression, may be so long in proportion to their diameter that failure may result by bending or buckling on the compression member. One such example would be that of an airplane flap drive screw wherein the flap on an aircraft wing is extended by rotation of a threaded structural member to cause the flap to pivot downwardly and rearwardly. The load carrying nut, affixed to the flap, moves rearwardly to provide a continually longer structural column as the load on the flap increases. The greatest compression force is thus applied when the effective length of the structural column is the longest. To prevent bending or buckling, the structural column is made of a larger diameter which, in turn, causes an increase in weight. This solution is in conflict with the requirement in aircraft to make objects of high strength-to-weight as possible.

SUMMARY OF THE INVENTION

Two shorter columns, having a total length of one longer column, can provide the same resistance to compression, bending, or buckling when such shorter columns are of considerably less weight, and of smaller diameter. A great saving in weight can thus be accomplished which, in turn, contributes to a reduction in operational and maintenance costs of the aircraft. The provision of two shorter columns is accomplished by using a column screw having two superimposed threads of different leads. A load carrying nut uses the greater lead and a screw support sleeve follows the lesser lead to reach a halfway position when the nut is extended to the full length of the column.

BRIEF DESCRIPTION OF THE DRAWINGS

FIG. 1 is a schematic illustration of a structural column support for a wing flap;

FIG. 2A is a schematic illustration of a column support of a given length and diameter;

FIG. 2B is a schematic illustration of a column support consisting of two half lengths which permits a diameter of less than that in FIG. 2A;

FIG. 2C is a schematic illustration of a column support, in accordance with the present invention, with the load carrying nut and support sleeve in retracted position;

FIG. 2D is a schematic illustration of a column support, in accordance with the present invention, with the nut and sleeve in extended position;

FIG. 3 is an enlarged view, partly in section, showing the dual threads on the column support and the load carrying nut and screw support mounted thereon; and FIG. 4 is an end view, taken along the line 4—4 of FIG. 1.

DETAILED DESCRIPTION OF ILLUSTRATIVE EMBODIMENT

Reference is now made to FIG. 1 wherein there is shown a rear portion 10 of an aircraft wing 12, having a retractable flap 14 mounted thereon. Flap 14 has a mounting bracket 16 with a plurality of rollers 18, having rolling engagement with a roller guide 20 as the flap moves between its retracted and extended position. The flap is shown in its retracted position whereas dashed line 22 indicates its extended position. The flap is actuated by a threaded column 24. This column is mounted on wing 12 by mounting supports 26 and 28 at each end. Further apparatus not shown causes the column to rotate in either direction, as desired. A load carrying nut 30 is mounted on the threaded column 24 and moves longitudinally therealong upon rotation of the column. Link 32 interconnects trunnions 34 on nut 30 with the wing flap 14 to cause its actuation as nut 30 moves. Positioned between mounting 26 and the load carrying nut 30 is a threaded sleeve or screw support 36, which also moves longitudinally on the threaded column 24 as the column is rotated. Support 36 is adapted to move at a velocity less than that of the load carrying nut 30 so that when the nut 30 is moved rearwardly to the position shown in dashed line, the support 36 is moved to its dashed line position to indicate a movement of approximately half that of nut 30. When the column 24 is rotated in the reverse direction to move the flap 22 from its extended position, the support 36, although moving at less velocity than that of nut 30, reaches its forward position while the nut 30 is travelling the greater distance.

Reference is now made to FIGS. 2A, 2B, 2C and 2D for an explanation of the evolution and principle of the present invention. In FIG. 2A, there is shown a column 24, having a diameter D and an effective length L between support 26 and load carrying nut 30 in its extended position. When a compressive force is applied to the column, such as upon the application of a force in the direction of arrow C on load carrying nut 30, in order to prevent bending or buckling of the column, there is a definite relationship between the minumum diameter D and the maximum length L for a maximum given compression load. As can be seen in FIG. 2B, when the length L is cut in half, such as by the positioning of a support 36 midway along the length of the column to thus prevent bending or buckling, the diameter of the column 24 in FIG. 2A may be much smaller.

The present invention incorporates the foregoing principle as will be understood with reference to FIGS. 2C and 2D. In FIG. 2C the screw support 36 and load carrying nut 30 are in their retracted position so that the effective length of the column 24 between the nut 30 and support 26 is at its minimum distance, whereas in FIG. 2D the effective length of the column 24 between the nut 30 and fastening 26 is at a maximum distance with the column support 36 positioned approximately midway.

The mechanism for accomplishing this desired result, which will permit a smaller diameter of column 24, may be seen in FIG. 3. Here two sets of threads are superimposed on the outer surface of column 24, having different depths of the groove and different leads to enable the load carrying nut 30 to travel longitudinally along the column 24 at a faster rate than that of the screw support sleeve 36. The lead for the load carrying nut 30 preferably is approximately twice that of the screw support sleeve 36 so that at the time the nut is fully extended, the support sleeve will have traveled half the distance. The groove 38 into which the internal threads of the load carrying nut 30 is carried is of a greater depth than is the groove 40 superimposed thereon to receive the internal threads of the screw support sleeve 36. The support threads may be very short axially and just long enough to give longitudinal stability to the support sleeve since it theoretically is not radially loaded. The radial load of a column center support would be zero if the center of support 26, support 36, support 28, and nut 30 were perfectly aligned and there were no deflections or acceleration loads to cause misalignment.

Since in this embodiment the screw column 24 is rotated, it is necessary that the load carrying nut 30 and the screw support sleeve 36 do not rotate as they travel longitudinally along the column. One example of this is shown in FIG. 4 which is a view taken along line 4—4 in FIG. 1. Here there are diametrically opposed tracks 42 parallel to, and in close proximity to, screw column 24. Suitable projections such as, for example, rollers 44 extend from the nuts and sleeves and abut against the track 42 to prevent their rotation as screw 24 is rotated. These tracks also support sleeve 36 in preventing bending or buckling of column 24. The view showing the nut 30 would be similar, with the exception of a showing of the trunnions 34, shown herein in dotted line.

It should be noted that in the practice of this invention, the center supporting sleeve 36 travels along a portion of the same path of travel of the load carrying nut 30 and is positioned approximately midway of the effective length of the column when the load carrying nut is extended. The sleeve is so positioned and has such a rate of travel that it moves to its retracted position and does not interfere with the movement of the load carrying nut 30. While in the illustrative example, the column is rotated and the sleeve and nut move longitudinally but do not rotate, there are other uses wherein the column does not rotate but the sleeve and nut do. The relative leads of the screw support sleeve and load carrying nut may be adjusted as desired, and in instances where other compressive forces are exterted on the column 24 when the load carrying nut 30 is in retracted position, another sleeve similar to screw support 36 may be positioned on the other side of the nut 30 to become centrally positioned when the load carrying nut is retracted. Such an example would be another sleeve 36A shown in dashed lines in FIG. 2C.

I claim:
1. A structural column support comprising:
   a rotatable column having a support sleeve and a load bearing nut nonrotatably mounted for simultaneous differential longitudinal movement therealong;
   said column having one end thereof mounted on aircraft wing structure;
   said nut being affixed to a movable aircraft flap for actuation thereof;
   said nut advancing along said column a predetermined increment distance per column revolution; and
   said support sleeve being threadedly engageable with said column for advancement along said column in the same direction but less tham said predetermined increment distance per column revolution.
2. A structural column support as set forth in claim 1, wherein said column has a first set of external threads thereon threadedly engageable with said load carrying nut for longitudinal advancement thereof, said column having a second set of external threads superimposed over said first set of threads to provide longitudinal movement of said column support sleeve.
3. A structural column support as set forth in claim 2, wherein said first set of threads have deeper grooves for carrying said nut, said second set of threads having grooves of less depth for carrying said sleeve.